United States Patent [19]
Borah et al.

[11] Patent Number: 5,325,678
[45] Date of Patent: Jul. 5, 1994

[54] TEMPERATURE CONTROLLER APPARATUS

[75] Inventors: Frederic M. Borah, Merrick; Anthony P. Caruso, St. James; Anthony Leib, Jr., Planview; Richard J. Gavarian, New Hyde Park; Edwin D. Lopez, Glen Oaks, all of N.Y.

[73] Assignee: Peerless Instrument Co., Inc., Elmhurst, N.Y.

[21] Appl. No.: 986,672

[22] Filed: Dec. 8, 1992

[51] Int. Cl.⁵ .............................. F25B 49/00
[52] U.S. Cl. ......................... 62/126; 62/129; 62/211; 236/94; 236/46 F
[58] Field of Search .............. 62/126, 127, 129, 130, 62/229, 211, 223, 50.2, 50.4, 225, 224; 236/94, 46 F

[56] References Cited

U.S. PATENT DOCUMENTS

| | | | |
|---|---|---|---|
| 3,410,109 | 11/1968 | Maryland | 62/457 |
| 3,421,336 | 1/1969 | Lichtenberger et al. | 62/45 |
| 3,456,455 | 7/1969 | Sapir | 62/223 |
| 3,959,982 | 6/1976 | Denis et al. | 62/223 |
| 4,308,725 | 1/1982 | Chiyoda | 62/129 |
| 4,381,549 | 4/1983 | Stamp, Jr. et al. | 62/126 |
| 4,432,210 | 2/1984 | Saito | 62/126 |
| 4,441,329 | 4/1984 | Dawley | 62/126 |
| 4,634,046 | 1/1987 | Tanaka | 236/46 F |
| 4,739,622 | 4/1988 | Smith | 62/78 |
| 4,807,445 | 2/1989 | Matsuoka et al. | 62/225 X |
| 4,852,360 | 8/1989 | Harshbarger, Jr. et al. | 62/126 |
| 4,936,105 | 6/1990 | Takechi et al. | 62/129 |
| 4,987,745 | 1/1991 | Harris | 62/78 |
| 4,991,402 | 2/1991 | Saia, III | 62/52.1 |
| 5,115,643 | 5/1992 | Hayata et al. | 62/126 X |
| 5,123,252 | 6/1992 | Hanson | 62/126 X |

*Primary Examiner*—Harry B. Tanner
*Attorney, Agent, or Firm*—Matthew K. Ryan; Dennis M. Smid

[57] ABSTRACT

Temperature controller apparatus for generating a control signal for supply to a control device which controls the temperature inside a chamber. The apparatus includes a plurality of input devices each receiving an indication of the temperature at a respective location in the chamber. Each of the received temperature indications is processed so as to form the control signal. In the event that any of the input devices fails to receive the respective temperature indication, output signals from such input devices are not utilized in forming the control signal. If all of the input devices fail to receive the respective temperature indications, the control signal is obtained from either previous control signals or previously stored control data.

27 Claims, 6 Drawing Sheets

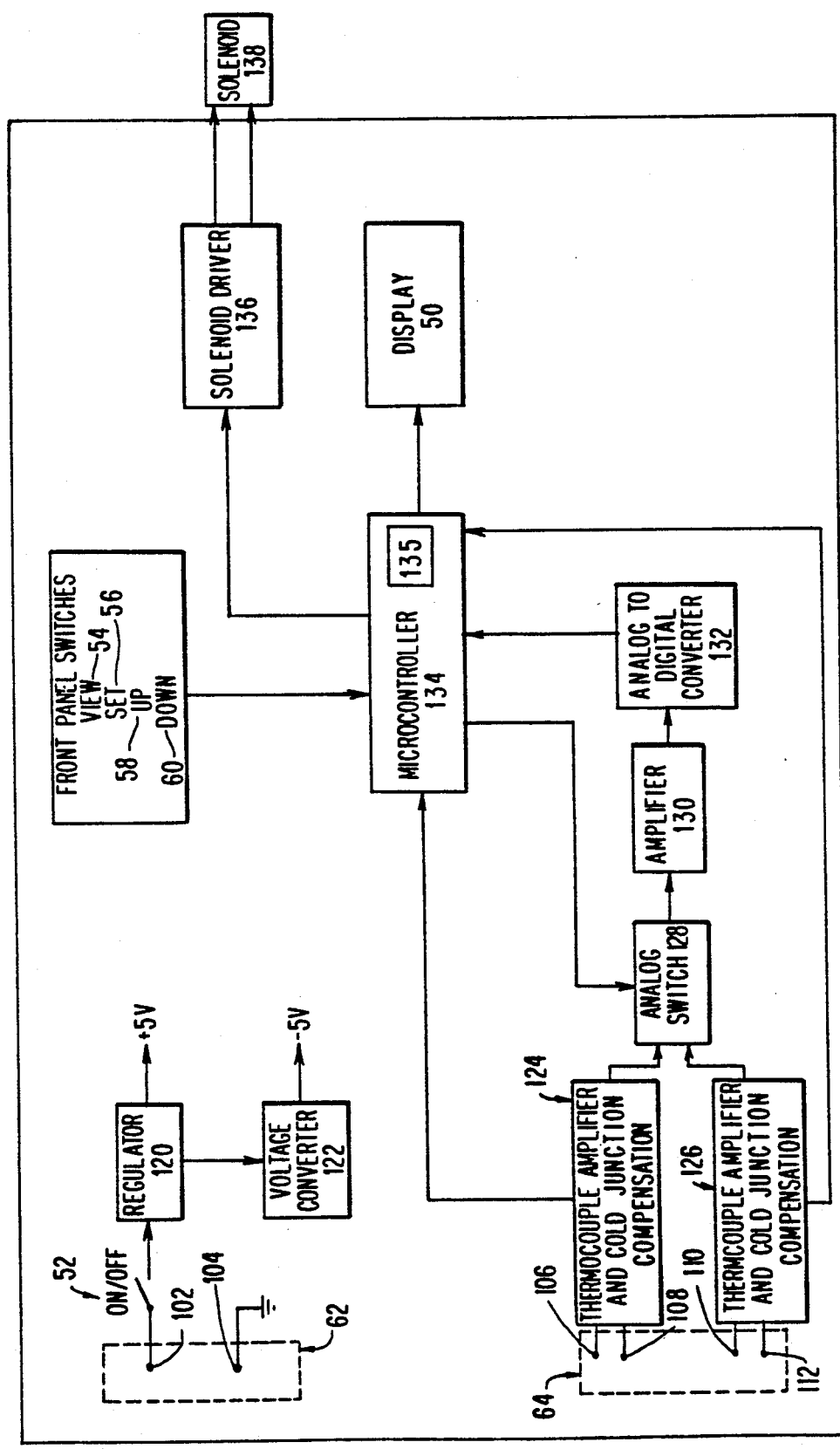

TEMPERATURE CONTROLLER APPARATUS

BACKGROUND OF THE INVENTION

1. Field of the Invention

This invention relates to a temperature controller apparatus and, more particularly, to such apparatus which provides multiple back-up modes in the event of a detected failure or failures for use with a temperature chamber.

2. Description of the Prior Art

In the prior art, temperature chambers, which may be used as refrigeration units, for example, in trucks, railroad cars or the like, to temporarily store perishable food goods while being transported to a desired destination, typically include a chamber which may have an insulated outer shell, a thermostatically controlled valve and one or more canisters having a supply of coolant contained therein. In such temperature chambers, the flow of coolant into the chamber is regulated by the control valve. That is, the thermostatically controlled valve monitors the temperature inside the chamber and, when the inside temperature rises above a predetermined set temperature, the control valve opens so as to allow the coolant to flow into the chamber, thereby lowering the inside temperature. The valve typically remains open until the inside temperature is reduced below the predetermined set temperature. A temperature probe, which is coupled to the control valve, may be utilized to enable an indication of the temperature at a particular location inside the chamber to be supplied to the control valve.

However, as is to be appreciated, a single temperature probe may not provide a reliable indication of the temperature inside the chamber. That is, depending on the location of the temperature probe inside the chamber, the probe may "sense" a temperature which is different than a temperature at other locations within the chamber. This may be due to the conventional positioning of the temperature probe proximate to the inlet of coolant flow into the chamber.

To provide a more accurate temperature value, multiple temperature probes which are located at respective locations inside the chamber may be utilized. In this situation, the temperature values from the probes are averaged and the averaged temperature is utilized to control the valve. However, if one or more of the multiple probes become defective or inoperative, the temperature obtained therefrom, even though it is erroneous, may still be utilized in computing the average temperature and supplied to the control valve. As a result, the flow of coolant into the chamber may be improperly regulated, thereby causing the inside chamber temperature to be improperly controlled. As is to be appreciated, this may damage the perishable food goods or other items contained within the temperature chamber.

Such problems also exist when the temperature chamber controls the temperature inside the chamber at relatively high temperature values. As is to be appreciated, in this situation, the temperature chamber includes a heat source whose operation is regulated so as to control the chamber temperature.

The prior art has therefore failed to provide a means for receiving temperature information from a plurality of temperature probes provided in such a temperature chamber and for providing therefrom a reliable temperature control signal for supply to a control valve or other similar device which, in turn, controls the temperature inside the temperature chamber even when one or more of the temperature probes are inoperative.

OBJECTS AND SUMMARY OF THE INVENTION

An object of the present invention is to provide temperature controller apparatus which overcomes the problems associated with the prior art.

More specifically, it is an object of the present invention to provide temperature controller apparatus for receiving temperature information from a plurality of temperature probes and for providing a reliable control signal therefrom for supply to a control device which, in response thereto, regulates the flow of coolant from one or more canisters into a chamber even when one or more of the temperature probes is inoperative.

Another object of the present invention is to provide temperature controller apparatus as aforementioned which detects if one or more of the temperature probes is inoperative and, upon such detection, disregards the temperature information received from the inoperative probe or probes.

It is still another object of the present invention to provide temperature controller apparatus as aforementioned in which a predetermined amount of prior control signals are stored and later supplied to the control device if all of the temperature probes are detected as being inoperative.

A still further object of the present invention is to provide temperature controller apparatus as aforementioned wherein a control signal, which is generated from the set temperature and predetermined control data which was previously stored, is supplied to the control device if all of the temperature probes are detected as being inoperative before the predetermined amount of the prior control signals can be obtained and stored.

A further object of the present invention is to provide temperature controller apparatus as aforementioned which determines when there is no more coolant in the canister or canisters and, upon such determination, terminates the generation of the control signal so as to conserve power.

Another object of the present invention is to provide temperature controller apparatus as aforementioned wherein the control device, in response to the control signal, regulates a heat source so as to increase the temperature in the chamber even when one or more of the probes is inoperative.

A further object of the present invention is to provide temperature controller apparatus as aforementioned which includes a microcontroller.

A still further object of the present invention is to provide temperature controller apparatus as aforementioned which is relatively easy to operate and provides operational and fault information to an operator.

In accordance with an aspect of this invention, a temperature controller apparatus for generating a control signal for supply to a device is provided which regulates the flow of a coolant into a chamber so as to regulate the temperature of the chamber. The apparatus includes a plurality of input means for receiving input signals representing temperatures at respective locations in the chamber and for processing each of the respective input signals so as to form respective temperature signals and for outputting the same therefrom; means for determining whether each of the input means receives the respective input signal; means for producing a fail signal in response to any of the input means failing to receive the respective input signal; means responsive to the fail signal for selecting only the output temperature signal from each of the input means which received its respective input signal; and means for processing each selected temperature signal so as to produce the control signal.

Other objects, features and advantages according to the present invention will become apparent from the following detailed description of the illustrated embodiment when read in conjunction with the accompanying drawings in which corresponding components are identified by the same reference numerals.

BRIEF DESCRIPTION OF THE DRAWINGS

FIG. 3 is a schematic block diagram of the temperature controller apparatus of FIG. 2.

DETAILED DESCRIPTION OF THE PREFERRED EMBODIMENT

Figure 1:
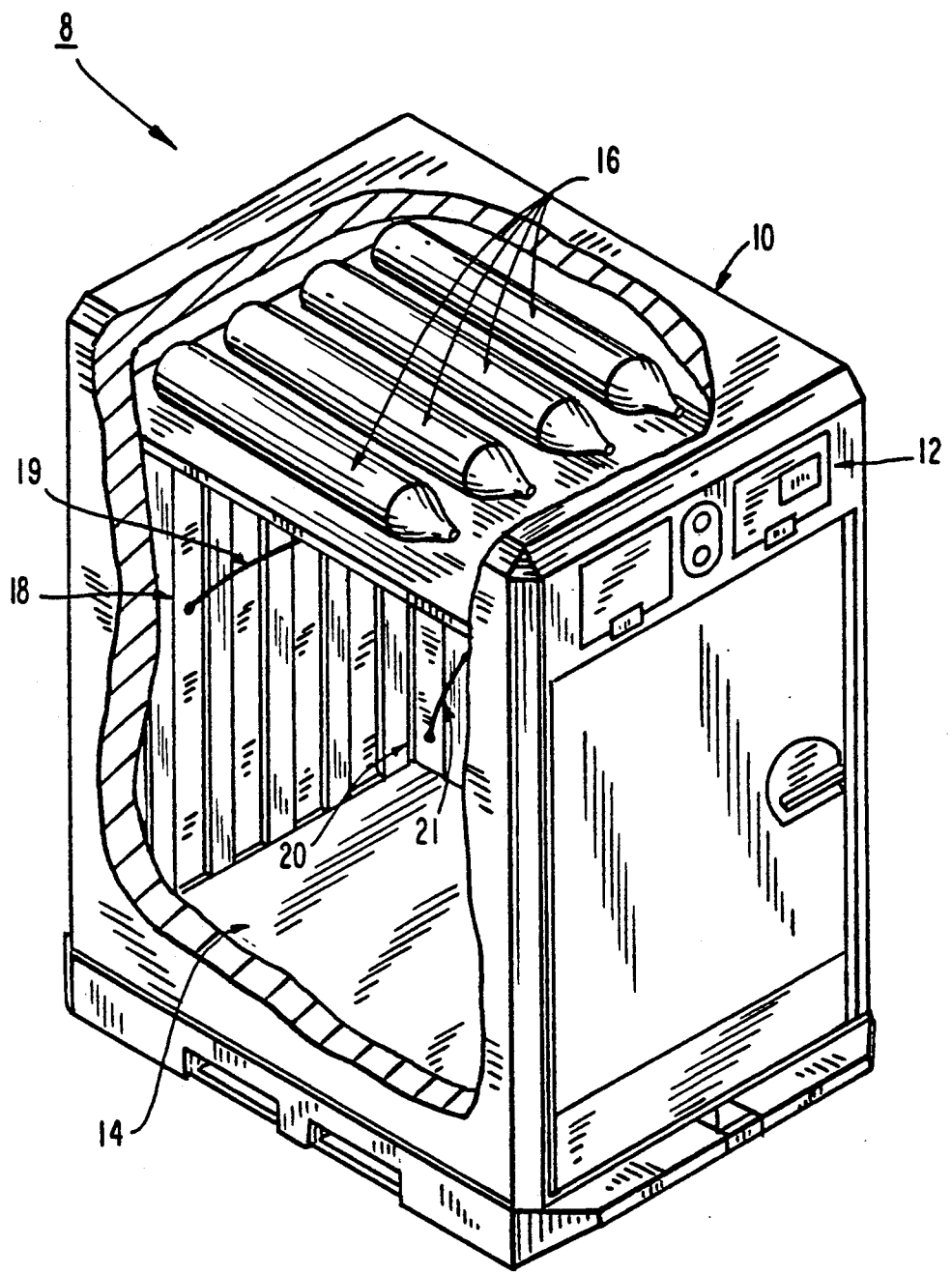
FIG. 1 is a perspective view of a temperature chamber in which a temperature controller apparatus according to an embodiment of the present invention may be utilized.

FIG. 1 illustrates a temperature chamber 8 which includes a temperature controller 12 in accordance with an embodiment of the present invention. As shown therein, the temperature chamber 8 further includes a housing 10 having six sides in which one of the sides includes a door so as to provide access to an inside storage portion 14 of the housing 10, thermocouples 18 and 20, and one or more canisters 16 for storing coolant, such as liquid $CO_2$, therein. Each of the sides of the housing 10 may include an insulating material so as to provide a relatively high thermal resistance between the inside portion 14 of the housing 10 and the ambient environment. As is to be appreciated, although only two thermocouples are shown in the temperature chamber 8, the present invention is not so limited and any number of thermocouples may be utilized.

The thermocouples 18 and 20 may be respectively secured to desired locations in the portion 14 and are coupled therefrom to the temperature controller 12 by way of thermocouple wires 19 and 21, respectively. Each of the thermocouples 18 and 20 are adapted to provide an indication of the temperature at the respective location. Each temperature indication is sensed by the temperature controller 12 and processed therein, as hereinafter more fully described, so as to form a control signal. This control signal is supplied to a solenoid 138 (FIG. 3) or such similar device which is coupled to a control valve (not shown) which, in turn, is coupled to the canisters 16. Upon receipt of the control signal from the temperature controller 12, the solenoid drives the control valve so as to open and close accordingly, thereby regulating the flow of coolant from the canisters 16 into the portion 14 so as to control the temperature therein.

Figure 2B:
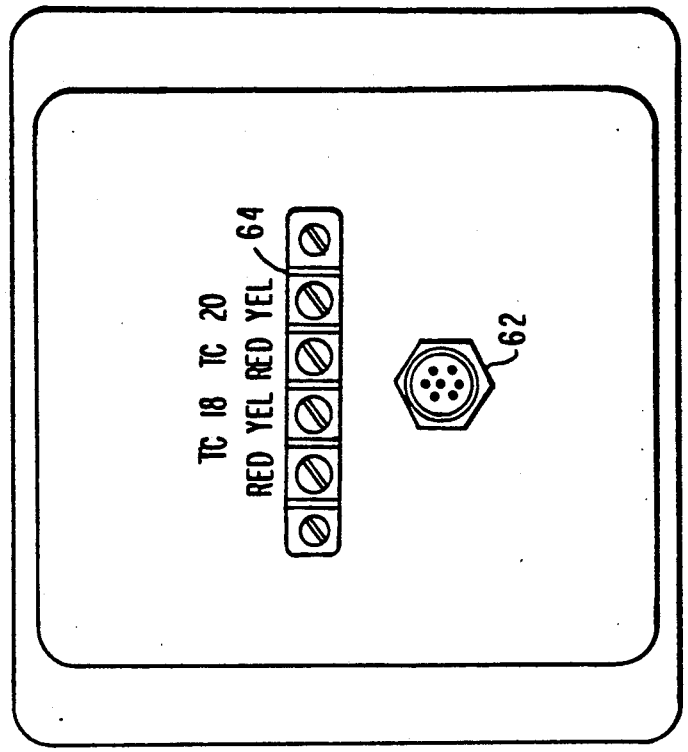
FIGS. 2A and 2B illustrate a front and rear view, respectively, of the temperature controller apparatus according to the embodiment of the present invention.
Figure 2A:
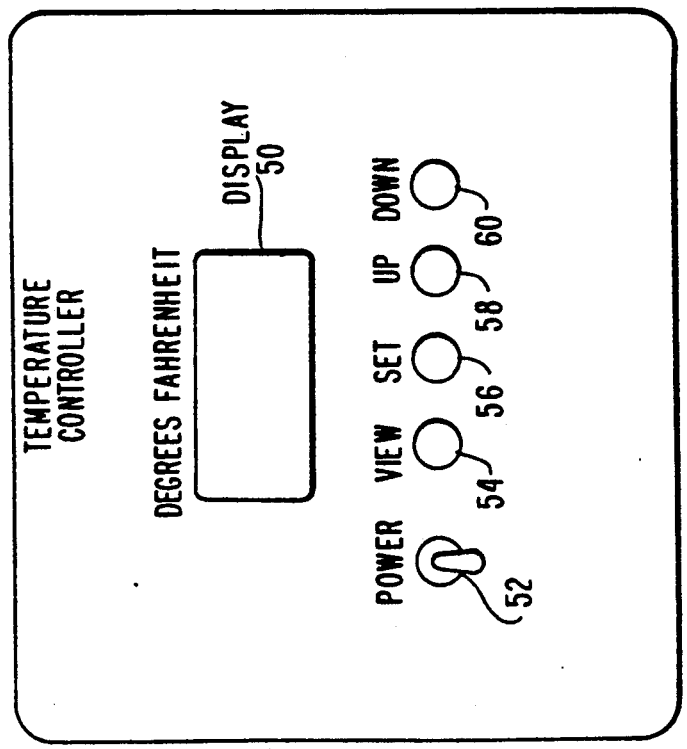

FIGS. 2A and 2B illustrate front and rear views, respectively, of the temperature controller 12. As shown in FIG. 2A, the front face of the temperature controller 12 generally includes a display 50, an on/off switch 52, a view switch 54, a set switch 56, and up and down switches 58 and 60, respectively. The display 50 is preferably a digital LED display which can display up to three digits and a decimal point to thereby provide an operator with temperature and operational information. The power or on/off switch 52 is coupled to an external power supply (not shown) and upon activation thereof is adapted to supply such power to the temperature controller 12, as more-fully described hereinafter. The switches 54, 56, 58 and 60, which are preferably momentary-type push switches, are connected to a microcontroller 134 (FIG. 3), such as microcontroller model no. 8751 or 8752 manufactured by the Intel Corporation, which, in turn, is connected to the display 50.

Upon pressing or activating one or more of the switches 54, 56, 58 and 60, desired information may be displayed on the display 50 or a desired function may be performed and the result thereof provided on the display 50. For example, upon pressing the view button 54, the current temperature inside the chamber 10 is displayed on the display 50. As will be more fully explained hereinafter, the current temperature is the average of the temperatures indicated by the thermocouples 18 and 20 when both thermocouples are operating properly and, if only one of the thermocouples is operating properly, the current temperature is the temperature indicated by only the working thermocouple. If, however, neither of the thermocouples are operating properly, the microcontroller provides a signal which indicates a predetermined temperature, such as 77° F. or room temperature, and a failure indication as hereinafter described. Alternately, in this situation, the microcontroller may only supply the failure indication.

Furthermore, to set a desired temperature at which the inside portion 14 of the housing 10 is to be maintained, the operator simultaneously presses the set button 56 and the appropriate one of the up or down buttons 58 and 60, respectively. As an example, by pressing the set button 56 and the up button 58, the temperature indicated on the display 50 is incrementally increased. Upon reaching the desired temperature, the operator merely releases the up button 58, whereupon the desired temperature is set. Similarly, by pressing the set button 56 and the down button 60, the temperature indicated on the display 50 is incrementally decreased and, upon reaching the desired temperature, the down button is released, whereupon the desired temperature is set. Upon pressing just the set button 56, the set or desired temperature is displayed on the display 50.

The temperature controller 12 may control the temperature of the inside portion 14 of the housing 10 to a value(s) which is contained within a predetermined temperature range which is previously stored within a memory 135 (FIG. 3). For example, when controlling the temperature of the inside portion 14 to a relatively low temperature, a temperature range from $-40°$ F. to $+70°$ F. may be utilized. (In the preferred embodiment, the temperature information is in degrees Fahrenheit (°F.).) This predetermined temperature range is "continuous" or "wraps around". That is, pressing the set button 56 and either the up or down buttons 58 or 60, respectively, causes the displayed temperature to be incrementally changed as previously described. Upon reaching either of the temperature limits (i.e., $-40°$ F. or $+70°$ F.) the next temperature to be displayed is the other temperature limit. As an example, consider the situation in which an operator is causing the displayed temperature to be incrementally decreased. In this situation, the next temperature value displayed after reaching −40° F. is +70° F.

As shown in FIG. 2B, the rear surface of the temperature controller 12 includes a connector 62 and a connecting member 64. The connector 62 is coupled through a corresponding mating connector (not shown) to the external power supply and the solenoid 138 (FIG. 3). The connecting member 64 is coupled to the thermocouple wires 19 and 21 of the thermocouples 18 and 20, respectively. More specifically, each of the thermocouple wires typically includes two wires which may be identified as RED and YELLOW wires which are connected to the connecting member as indicated in FIG. 2B.

To protect the microcontroller 134 and the other circuitry included in the temperature controller 12 from moisture contamination so as to ensure proper operation, the temperature controller is preferably moisture resistant. Furthermore, the temperature controller is preferably designed to withstand the anticipated shock, vibration and other environmental conditions. Such design considerations are well known in the art and, as such, will not be described herein.

FIG. 3 illustrates the temperature controller 12 in block diagram form. As shown therein, the temperature controller 12 generally includes thermocouple amplifier and cold junction compensation (TACJC) circuits 124 and 126, an analog switch 128, an amplifier 130, an analog-to-digital (A/D) converter 132, the microcontroller 134, a solenoid driver circuit 136, the display 50 and the switches 54, 56, 58 and 60.

The thermocouples 18 and 20 are respectively connected, by way of thermocouple wires 19 and 21, to input terminals 106, 108 and 110, 112 of the connecting member 64. As an example, the RED and YELLOW wires in the thermocouple wire 19 may be connected to the input terminals 106 and 108, respectively. The thermocouple wire 21 may be similarly connected to the input terminals 110 and 112. As previously indicated, in the preferred embodiment, the temperature information supplied to the temperature controller 12 is in degrees Fahrenheit (°F.). The input terminals 106 and 108 are coupled to the TACJC circuit 124 which is adapted to receive the temperature information from the thermocouple 18 and provide an amplified signal indicating the difference between the temperature sensed by thermocouple 18 and 32° F. Without cold junction compensation, the signal supplied from the circuit 124 would include an error term that is proportional to the ambient temperature around circuit 124. Similarly, the thermocouple 20 is connected by way of the thermocouple wire 21 and the input terminals 110 and 112 to the TACJC circuit 126 which is adapted to function in a manner similar to that of circuit 124. Each of the TACJC circuits 124 and 126 may be contained on a single integrated circuit chip.

Each of the TACJC circuits 124 and 126 is coupled to the microcontroller 134 and is further adapted to supply thereto a signal indicating that the respective thermocouple is inoperative or is not operating properly. In the preferred embodiment, the signal from the TACJC circuits indicates whether there is an effective electrical open circuit (hereinafter, an "open") between the respective thermocouple and the corresponding TACJC circuit. For example, when there is such an open, the signal supplied from the appropriate one or ones of the TACJC circuits 124 and 126 may have a value of approximately 0 volts, whereas if no such open exists, the signal supplied from the TACJC circuit(s) may have a value of approximately 5 volts.

Each of the TACJC circuits 124 and 126 are further coupled to the analog switch 128 so as to respectively supply the amplified signals indicating the temperatures sensed by the thermocouples 18 and 20 thereto. The microcontroller 134 is also coupled to the analog switch 128 and, in response to the signals received from the TACJC circuits 124 and 126 regarding whether an electrical open exists, provides a corresponding signal to the analog switch so as to indicate whether an open or failure exists. The analog switch 128, in response to the signal received from the microcontroller 134, is adapted to select the appropriate output signal or signals from the TACJC circuits 124 and 126 and to supply the same to the amplifier 130.

More specifically, if the signal from the microcontroller 134 indicates that neither thermocouple or thermocouple wire or path contains an open, the analog switch 128 selects the output signals from the circuits 124 and 126 on an alternating basis for supply to the amplifier 130. If, however, the signal from the microcontroller 134 indicates that one of the thermocouples and/or its associated path contains an open, the analog switch 128 does not select the output signal from the TACJC circuit corresponding thereto and only selects the output signal from the TACJC circuit which receives information from a thermocouple and its respective thermocouple wire which does not contain an open. If the signal from the microcontroller 134 indicates that both of the thermocouples and/or thermocouple wires contain an open, the analog switch 128 does not select either of the output signals from the TACJC circuits 124 and 126. Alternately, the analog switch 128 may still selectively receive the signals from one or both of the circuits 124 and 126 for subsequent supply to the microcontroller 134, as hereinafter described, even though such signals contain erroneous information, whereupon the microcontroller is adapted to merely disregard such erroneous signals. In this latter situation, regardless of whether the analog switch 128 does not supply either of the output signals from the circuits 124 and 126 or supplies one or both of such signals to the microcontroller which disregards such signals, either prior information obtained from the circuit 124 and/or 126 over a predetermined period of time or previously stored temperature information is utilized, as morefully described hereinafter.

The output signal from the analog switch 128 is supplied to the amplifier 130, as previously described, so as to be amplified therein to a predetermined level. The amplified signal from the amplifier 130 is supplied to the A/D converter 132 and converted thereat from an analog signal to a digital signal and supplied therefrom to the microcontroller 134.

As previously mentioned, the microcontroller 134 is coupled to the switches 54, 56, 58 and 60, the display 50, the TACJC circuits 124 and 126, the analog switch 128 and the A/D converter 132. In addition, the microcontroller 134 is coupled to the solenoid driver circuit 136. The microcontroller 134, which contains a previously stored algorithm or software program, is adapted to receive the signals from the circuits 124 and 126, the A/D converter 132 and the switches 54, 56, 58 and 60 and to perform the appropriate processing in accordance with the stored algorithm and to supply a resulting signal to the appropriate one or ones of the analog switch 128, solenoid driver circuit 136 and display 50. For example, as previously described, in response to the signals from the circuits 124 and 126, the microcontroller 134 supplies a corresponding signal to the analog switch 128.

Further, the microcontroller 134, in response to request signals received from one or more of the switches, performs the requested processing and supplies a corresponding output signal to the display 50, whereupon the requested information is displayed. For example, upon pressing the view switch 54, a signal requesting that the current temperature of the inside portion 14 be displayed on the display 50 is supplied to the microcontroller 134. Upon receipt of such request signal, the microcontroller 134 provides a signal which indicates the current temperature which, as previously described, if at least one of the thermocouples and its path does not contain an open, may be the average of the temperatures sensed by the thermocouples 18 and 20 or the temperature sensed by one of the thermocouples 18 and 20 to the display 50.

Furthermore, the microcontroller 134 receives the temperature information from the A/D converter 132 and, in response thereto, generates a control signal for controlling a duty cycle of the solenoid 138. This control signal is supplied from the microcontroller 134 to the solenoid driver circuit 136 which, in turn, provides an output signal therefrom for energizing the coil (not shown) of the solenoid. If the signals supplied to the microcontroller 134 from the A/D converter 132 represent the output signals supplied from both the circuits 124 and 126, the microcontroller 134 calculates an average temperature therefrom which is used in calculating the control signal. If, however, the signals supplied to the microcontroller 134 from the A/D converter 132 represent the output signals from only one of the circuits 124 and 126, the microcontroller 134 only uses this temperature information in determining the control signal.

As previously described, when both of the thermocouples 18 and 20 and/or thermocouple wires 19 and 21 contain an open, the microcontroller 134 either does not receive output signals from the A/D converter 132 or disregards such signals if received. In this situation, the microcontroller 134 supplies to the solenoid driver circuit 136 a control signal which is based on either prior or historical information data received from one or both of the circuits 124 and 126 or the set temperature and previously stored predetermined control data.

More specifically, the microcontroller 134 includes the storage or memory device 135 which may contain a RAM (Random Access Memory) and a ROM (Read Only Memory). The predetermined control data, which may be in the form of a look-up table, is stored within the ROM. This predetermined control data, which is a function of the set temperature, represents the "most likely scenario" for control of the temperature chamber 8 and may be based upon theoretical or previously obtained empirical temperature information for the temperature chamber or similar such temperature chambers. On the other hand, the prior or historical information data is stored in the RAM. This historical data represents a predetermined amount of a prior duty cycle of the solenoid 138 (for example, the control signals generated for the previous hour of temperature control) which was determined by the microcontroller 134 based upon temperature information supplied from one or both of the circuits 124 and 126.

As a result, when both of the thermocouples 18 and 20 and/or thermocouple wires 19 and 21 contain an open, the microcontroller 134 utilizes the historical data stored in the RAM of the memory device 135 to form a control signal which is supplied to the solenoid driver circuit 136. This, in turn, provides an output signal therefrom so as to energize the coil and regulate the valve in a manner similar to that previously described. However, if both of the thermocouples and/or thermocouple wires are detected as having an open before the predetermined amount of historical information can be obtained and stored in the RAM of the memory 135, then the microcontroller 134 generates a control signal by utilizing the set temperature and the predetermined control data from the ROM. That is, the data corresponding to the set temperature from the look-up table is obtained and utilized to form the control signal. Such control signal is thereafter supplied to the solenoid driver circuit 136 so as to energize the coil and regulate the valve in a manner similar to that previously described.

The microcontroller 134 is still further adapted to determine if the canisters 16 are empty. That is, the microcontroller 134 monitors the temperature of the inside portion 14. If, after a predetermined time period from supplying a control signal to the solenoid driver circuit 136, the temperature of the inside portion 14 is not decreasing, then the microcontroller concludes that the canisters are empty and, as a result, supplies a signal indicating a "no coolant failure" to the display 50 and terminates control of the solenoid so as to conserve power. As is to be appreciated, in order for the microcontroller 134 to provide such a determination regarding the canisters 16, at least one of the thermocouples 18 and 20 and its respective thermocouple wire cannot contain an open.

As previously indicated, the display 50 is adapted to display operational information. More specifically, the microcontroller 134 supplies signals relating to the operation of the temperature controller 12 to the display 50 so as to provide a visual indication to the operator of the operational status of the temperature controller. For example, if the temperature controller is operating correctly, a blinking dot may be displayed on the display 50. However, upon detection of a failure, a dash may be displayed on the display 50, whereupon the blinking dot is either eliminated or continued depending upon the severity of the failure. As an example, in the event of a "no coolant" failure, the blinking dot is no longer displayed since the temperature controller 12 is no longer operational. However, in the situation in which an open is detected in one of the two thermocouples or thermocouple paths, such an open or failure may not be considered severe, since the other thermocouple can still supply reliable information. Thus, in this latter situation, a dash and the blinking dot may be displayed on the display 50.

The display 50 may also provide other indications to the operator, such as a reminder to set the desired set temperature. Furthermore, upon applying power to the temperature controller 12, a power-up display may be provided.

Input terminals 102 and 104 of the connector 62 receive supply power from the external power source. The input terminal 102 is connected through the on/off switch 52 to a regulator 120 which is adapted to provide a signal therefrom having a predetermined voltage level. An output from the regulator 120 is supplied to a voltage converter 122 which is adapted to provide a signal therefrom having another predetermined voltage level. As shown in FIG. 3, the input terminal 104 is connected to ground.

In a preferred embodiment, +12 volts is applied to the input terminal 102. As a result, upon activating or closing the on/off switch 52, the received +12 volt signal is applied to the regulator 120 which produces and supplies therefrom a +5 volt signal and the voltage converter 122 produces and supplies therefrom a −5 volt signal. The +/−5 volt signals from the regulator 120 and the voltage converter 122, respectively, are used to power the circuit of the temperature controller 12. Although not shown, the solenoid 138 may be powered by the 12 volt external power source.

Figure 4A:
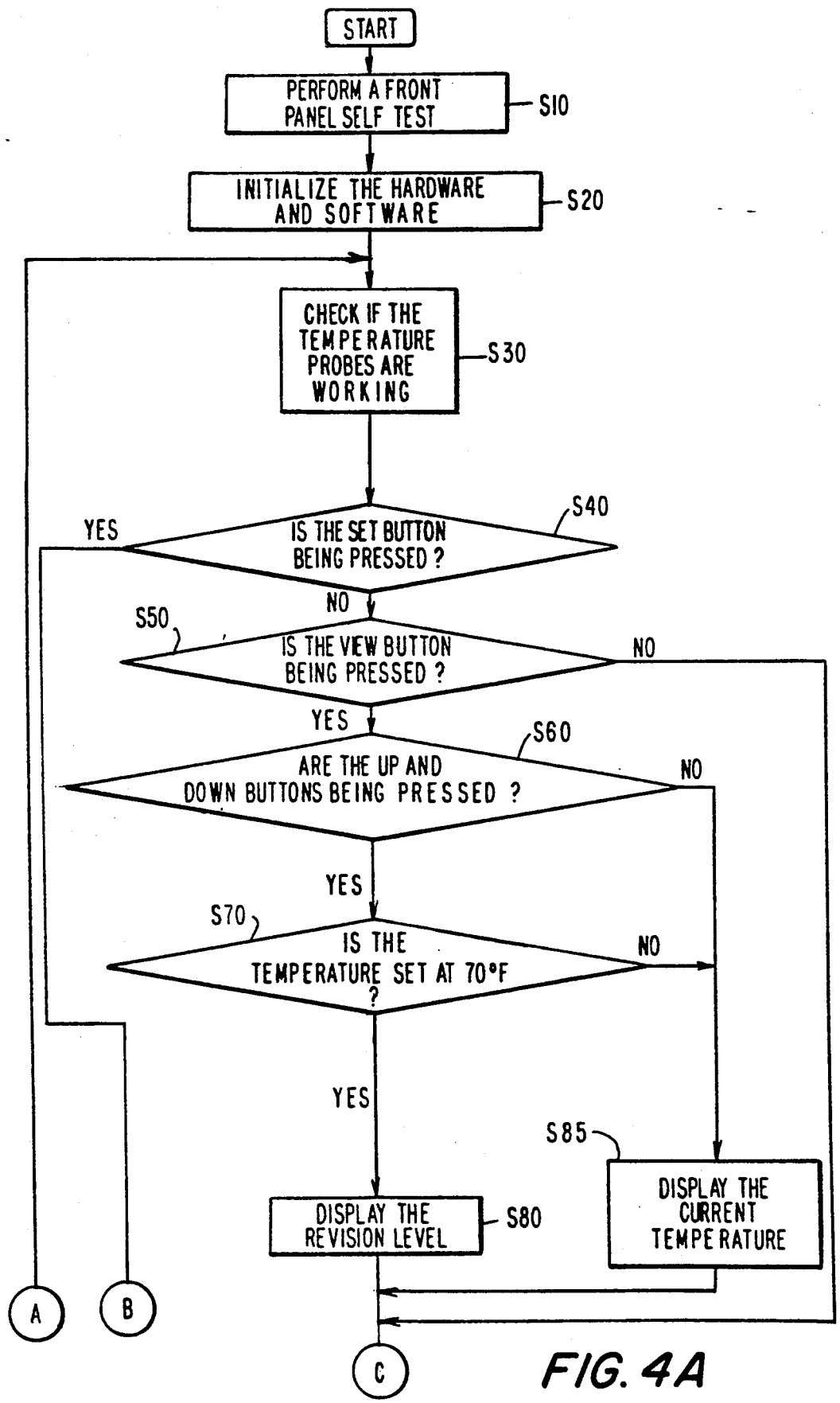
FIGS. 4A, 4B and 4C are a flow diagram to which reference will be made in explaining the operation of the temperature controller apparatus of FIG. 2.
Figure 4B:
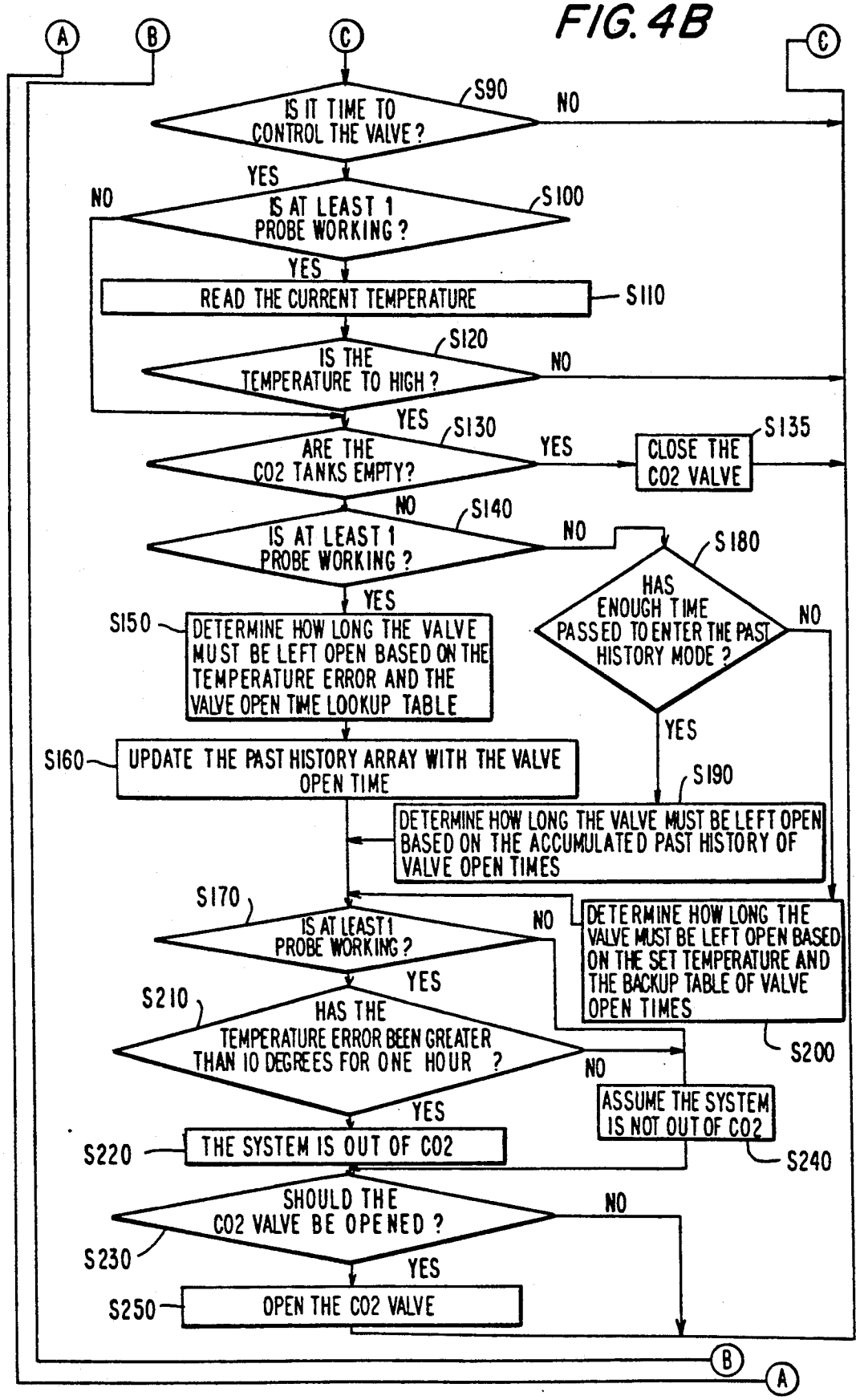
Figure 4C:
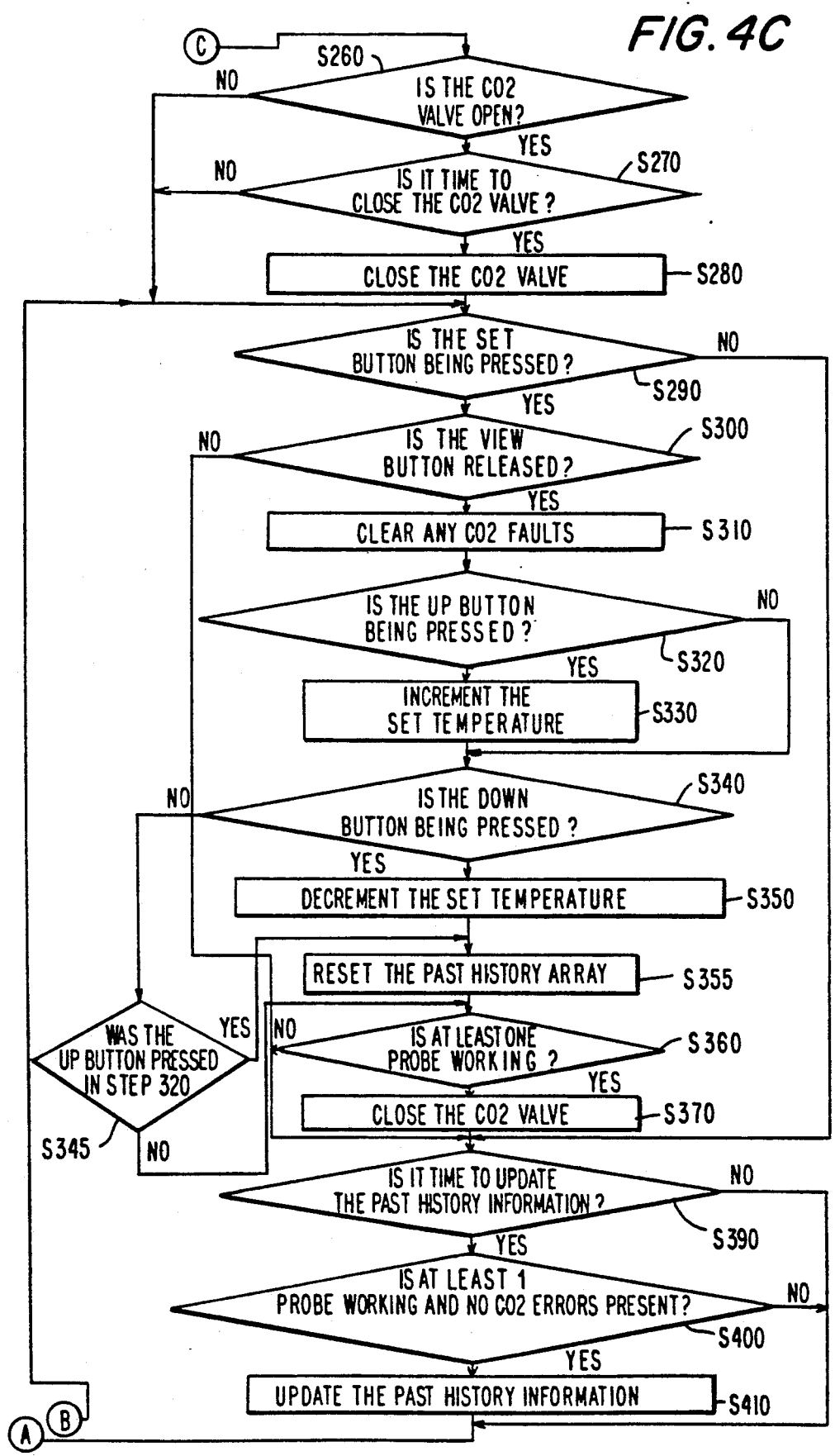

The operation of the temperature controller 12 will now be described with reference to the flow diagram illustrated in FIGS. 4A and B.

Upon closing the on-off switch 52, power is supplied to the temperature controller 12, as previously described. As a result, the temperature controller 12 performs a self test and an initialization routine as indicated in steps S10 and S20. This may include illuminating all of the LED segments for a few seconds so as to enable the operator to determine that such segments are operating properly. Thereafter, the display 50 may illustrate a predetermined pattern such as "---" so as to remind the operator to adjust the set temperature. Further, at this time, the temperature controller 12 may reset all internal timers and counters (not shown), provide a control signal to close the valve, and initialize the set temperature to a predetermined value such as 40° F.

In step S30, the microcontroller 134 determines if there is an open in one of the thermocouples 18 and 20 and/or their associated thermocouple paths. As previously described, such determination can be made by the microcontroller by examining the signals supplied from the TACJC circuits 124 and 126. The result of this determination is stored within the storage memory 135 of the microcontroller 134 for subsequent use. Thereafter, processing proceeds to step S40.

In step S40, a determination is made as to whether the set button 56 has been activated or pressed. If the determination in step S40 is negative, processing proceeds to step S50, whereupon a determination is made as to whether the view switch 54 has been pressed. If the determination in step S50 is affirmative, processing proceeds to step S60 whereupon a determination is made as to whether the up and down switches 58 and 60, respectively, have been pressed. If the determination in step 60 is affirmative, processing proceeds to step S70 wherein a determination is made as to whether the temperature is set at a predetermined value such as 70° F. If the determination at step S70 is affirmative, the revision level of the temperature controller 12 and, in particular, the revision of the software program utilized by the microcontroller 134 is displayed on the display 50, as indicated in step S80. Thus, to display the revision level on the display 50, an operator sets the set temperature to 70° F. and simultaneously presses the view switch 54 and the up and down switches 58 and 60, respectively. This display of the revision level is primarily intended for use by the manufacturer and/or its designated dealers or agents. Processing thereafter continues to step S90.

If, on the other hand, the determination in step S50 is negative, processing proceeds directly to step S90. Further, if the determination in either of steps S60 or S70 is negative, processing proceeds to step S85, whereupon the current temperature of the portion 14 (FIG. 1) is displayed on the display 50. Thereafter, processing proceeds to step S90.

At step S90, a determination is made as to whether it is time to supply a control signal to the solenoid driver circuit 136 so as to energize the solenoid coil in the solenoid 138 and control the valve. That is, the valve may be controlled so as to only open or close in accordance with a predetermined time arrangement which is maintained by a system clock (not shown) utilized by the microcontroller 134. If the determination is step S90 is affirmative, processing proceeds to step S100, whereupon a determination is made as to whether at least one of the thermocouples and its associated path does not contain an open. Such determination is based upon the results obtained in the above-described step S30. If the determination at step S100 is affirmative, thereby indicating that at least one thermocouple and its associated path does not contain an open, processing proceeds to step S110. At step S110, the current temperature in the storage portion 14 is obtained as previously described. That is, if the two thermocouples and their associated paths do not contain an open, the average temperature therebetween is calculated, whereas if only one thermocouple and its path does not contain an open, the current temperature is based on the information received from this thermocouple only. Thereafter, processing proceeds to step S120, whereupon a determination is made as to whether the current temperature is too high, that is, is the current temperature higher than the set temperature? If the determination at step S120 is affirmative, processing proceeds to step S130.

If, on the other hand, the determination in step S100 is negative, processing proceeds directly to step S130. That is, if at least one thermocouple with its associated thermocouple path does not contain an open, an accurate current temperature of the portion 14 cannot be determined.

At step S130, a determination is made as to whether the canisters 16 (FIG. 1) are empty. If the determination in step S130 is negative, processing proceeds to step S140, whereupon a determination is made as to whether at least one thermocouple and its path does not contain an open. Such determination, as with the determination of step S100, is based upon the results obtained in step S30. If the determination in step S140 is affirmative, processing proceeds to step S150, whereupon a determination is made as to how long the valve should be left open. Such determination may be based upon the temperature error, which is the difference between the current temperature and the set temperature, and a valve open time look-up table which relates temperature difference values with the times with which the valve should be kept open. Thus, upon determining the temperature error, the microcontroller 134 obtains the corresponding valve open time from the valve open time look-up table. Such look-up table may be stored in the ROM of the memory device 135. Thereafter, processing proceeds to step S160, whereupon the values determined in step S150 are utilized in updating an array containing the past history of the valve open time or duty cycle. Such past history data is stored within the RAM of the memory device 135. Thereafter, processing proceeds to step S 170.

If, on the other hand, the determination in step S140 is negative, processing proceeds to step S180. At step S180, a determination is made as to whether enough time has passed since the temperature controller 12 has been activated so as to enable a sufficient amount of valve open data (as in steps S150 and S160) to be collected so as to enter a past history mode. More specifically, if the temperature controller 12 has been operating for a predetermined time period (such as one hour), the amount of past history array or historical information data stored within the RAM of the memory 135 is large enough so as to provide a reasonable representation of future valve duty cycle requirements and thereby permit a reliable control signal to be generated therefrom. If the determination in step S180 is affirmative, processing proceeds to step S190, whereupon the microcontroller 134 determines how long the valve should be left open based upon the accumulated past history values or historical data obtained from the RAM of the memory 135. Thereafter, processing proceeds to step S170.

If, on the other hand, the determination in step S180 is negative, processing proceeds to step S200. At step S200, the microcontroller 134 determines how long the valve should be left open based upon the set temperature and a previously stored backup table of predetermined valve-open times vs. set temperatures which is stored in the ROM of the memory device 135. That is, a look-up table containing values for the valve open time vs. set temperatures, which may be based on theoretical or empirical data, is stored within the ROM prior to the operation of the temperature chamber 8 (FIG. 1), as previously described. Thereafter, processing proceeds to step S170.

At step S170, a determination is made as to whether at least one thermocouple and its associated path does not contain an open. Such determination, like that of steps S100 and S140, is based on the information obtained in step S30. If the determination in step S170 is affirmative, processing proceeds to step S210, whereupon a determination is made as to whether the temperature error (i.e., the difference between the current temperature and the set temperature) has been greater than a predetermined amount for a predetermined time period. As an example, a temperature of more than several degrees for one hour may be utilized in step S210. If the determination in step S210 is affirmative, processing proceeds to step S220, whereupon the microcontroller 134 determines that the canisters 16 (FIG. 1) are empty. An indication that the canisters 16 are empty may be provided to the operator by displaying a dash and terminating the blinking dot on the display 50, as previously described. Thereafter, processing proceeds to step S230. If, on the other hand, the determination in either of steps S170 or S210 is negative, processing proceeds to step S240, whereupon an assumption is made that the canisters 16 are not empty. Thereafter, processing proceeds to step S230.

At step S230, a determination is made as to whether the valve should be opened. Such determination may be based on the results of either of steps S150, S190 or S200. If the determination in step S230 is affirmative, processing proceeds to step S250, whereupon a corresponding control signal is provided to the solenoid driver circuit 136 so as to cause the valve to be opened accordingly. Thereafter, processing proceeds to step S260. If, on the other hand, the determination of step S230 is negative, processing proceeds directly to step S260. Similarly, if the determination in either of steps S90 or S120 is negative, processing also proceeds to step S260. Further, if the determination in the above-described step S130 is affirmative, processing proceeds to step S135, whereupon a control signal is provided so as to close the valve. Thereafter, processing proceeds to step S260.

At step S260, a determination is made as to whether the valve is open. If the valve is open, processing proceeds to step S270, whereupon a determination is made as to whether it is time to close the valve. Such determination is based on the values determined in either of steps S150, S190 or S200 compared to the elapsed time since the valve has been opened in step S250. If it is time to close the valve, a control signal is provided so as to close the valve in step S280, whereupon the processing proceeds to step S290. On the other hand, if the determination in either of steps S260 or S270 is negative, processing proceeds directly to step S290. Likewise, if the determination in step S40 is affirmative, processing also proceeds directly to step S290.

In step S290, a determination is made as to whether the set switch 56 is being activated or pressed. If the set switch 56 is being pressed, processing proceeds to step 300, whereupon a determination is made as to whether the view switch 54 has been released. If the view switch 54 has been released, any faults relating to the coolant which may be displayed on the display 50 are temporarily cleared in step S310. As is to be appreciated, this allows the desired set temperature to be displayed during the temperature setting operation. Thereafter, processing proceeds to step S323, whereupon a determination is made as to whether the up switch 58 is currently being pressed. If the up switch 58 is being pressed, the set temperature displayed on the display 50 is incremented in step S330. Thereafter, processing proceeds to step S340. On the other hand, if the up switch 58 is not being pressed in step S320, processing proceeds directly to step S340.

At step S340, a determination is made as to whether the down switch 60 is currently being pressed. If such switch is currently being pressed, the set temperature displayed on the display 50 is decreased accordingly as indicated in step S350. Thereafter, processing proceeds to step S355, whereupon the past history array is reset. That is, whenever the set temperature is changed, it is preferable to erase or delete from the RAM of the memory 135 any previously stored historical data. Thereafter, processing proceeds to step S360. If, on the other hand, the down switch 60 is not being pressed in step S340, processing proceeds to step S345, whereupon a determination is made as to whether the up switch 58 was pressed in step S320. If the determination in step S345 is affirmative, processing proceeds to step S355, otherwise processing proceeds to step S360.

In step S360, a determination is again made as to whether at least one thermocouple and its associated path does not contain an open. This determination, like that in steps S100, S140 and S170, is based on the information determined in step S30. If the determination in step S360 is affirmative, processing proceeds to step S370, whereupon a control signal is provided so as to close the valve. Thereafter, processing proceeds to step S390.

If, on the other hand, the determination in step S300 is negative, processing also proceeds directly to step S390. Likewise, if the determination in either of steps 290 or S360 is negative, processing proceeds directly to step S390.

In step S390, a determination is made as to whether the past history information stored in the RAM of the memory 135 should be updated. If the determination in step S390 is affirmative, processing proceeds to step S400, whereupon a determination is made as to whether at least one thermocouple and its associated path do not contain an open and whether any coolant errors currently exist. If the determination of step S400 is affirmative, processing proceeds to step S410, whereupon the past history array of information is updated. Thereafter, processing proceeds back to step S30. If, on the other hand, the determination in either of steps S390 or S400 is negative, processing proceeds directly therefrom to step S30.

Upon returning to step S30, the cycle is again executed. This cycle is preferably continuously repeated at a predetermined rate, such as approximately 350 millisecond per cycle.

As is to be appreciated, information or results of determinations which were made during the first, or a previous cycle, may be carried forward to a subsequent cycle. For example, assume that the microcontroller 134 determined in steps S210 and S220 of a previous cycle that the canisters 16 are empty. As a result, the determination of step S130 of the subsequent cycle would be affirmative, whereupon processing would proceed through step S135 to step S260 and bypass steps S140 through S250, thereby conserving power as previously described.

Although the above-described embodiment has been described so as to control the temperature of the inside of a chamber to a low value, whereupon a supply of coolant is required, the present invention is not so limited and may be utilized to control the temperature of the inside of the chamber to a higher value, whereupon a heat source may be controlled. Similarly, the present invention may be utilized to control the temperature of the inside of the chamber between such low and high values. Further, the temperature information supplied to the present temperature controller need not be in degrees Fahrenheit, but may instead be supplied thereto in any temperature units. However, in this latter situation, the cold junction compensation circuits may be either eliminated or modified accordingly. Furthermore, although the microcontroller only utilizes signals from a thermocouple or thermocouples which do not contain an open, as previously described, the microcontroller could also reject signals from a thermocouple (s) based upon other criteria. As an example, consider the situation in which three or more thermocouples are being utilized and one or more of them (a minority) is supplying an indication of a temperature which is "suspiciously" different from the temperature indications obtained from the other (majority) thermocouples. In this situation, the microcontroller could monitor the temperatures supplied from all of the thermocouples and determine if any one (or a minority) of the temperatures deviates by more than a predetermined amount from the remaining (majority) temperatures, whereupon such temperatures are not utilized in further processing to obtain the control signals.

Thus, the present temperature controller provides a means to control the temperature of a chamber which has multiple reliable back-up modes of operation which are automatically activated in the event of a detected failure(s). Further, the present temperature controller is relatively easy to operate, provides operational information to an operator and has a relatively low fabrication cost. Furthermore, when controlling relatively low temperatures, the present temperature controller determines when there is no more coolant and, upon such determination, terminates control so as to conserve power.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. Temperature controller apparatus for generating a temperature control signal for supply to a device which regulates flow of a coolant into a chamber so as to control the temperature of said chamber so as to maintain said chamber at a desired one of a plurality of set temperatures, said apparatus comprising:

memory means for storing predetermined control data, said predetermined control data being related to said set temperatures;

a plurality of input means for receiving input signals representing temperatures at respective locations in said chamber and for processing each of said respective input signals so as to form respective temperature signals and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each of said input means which received the respective input signal; and means for processing each selected temperature signal so as to produce said temperature control signal without utilizing said predetermined control data, said means for processing including means for generating said temperature control signal from said predetermined control data stored in said memory means based upon the desired set temperature when none of said input means receives the respective input signal.

2. Temperature controller apparatus according to claim 1, wherein said memory means further stores therein a predetermined amount of previously produced control signals and wherein said generating means utilizes the stored previously produced control signals in generating said temperature control signal upon an occurrence of a predetermined event.

3. Temperature controller apparatus according to claim 1, wherein said means for processing each selected temperature signal includes a microcontroller.

4. Temperature controller apparatus according to claim 1, wherein said coolant is contained within at least one storage means and further comprising means for determining whether any of said coolant is contained in the at least one storage means and for controlling the generation of said temperature control signal based upon such determination.

5. Temperature controller apparatus according to claim 1, wherein said temperature control signal is representative of a duty cycle for said device which regulates the flow of said coolant.

6. Temperature controller apparatus according to claim 1, wherein each of said input means includes a thermocouple.

7. Temperature controller apparatus according to claim 6, wherein each of said input means further includes means for processing the respective input signal so as to form a respective absolute temperature signal.

8. Temperature controller apparatus according to claim 1, further comprising display means for displaying requested information and operational information relating to the operation of said apparatus.

9. Temperature controller apparatus for generating a temperature control signal for supply to a control device which controls the temperature of a chamber so as to maintain said chamber at a desired one of a plurality of set temperatures, said apparatus comprising:
memory means for storing predetermined control data, said predetermined control data being related to said set temperatures;
a plurality of input means for receiving input signals representing temperatures at respective locations in said chamber and for processing each of said respective input signals so as to form respective temperature signals and for outputting the same therefrom;
means for determining whether each of said input means receives the respective input signal;
means for producing a fail signal in response to any of said input means failing to receive the respective input signal;
means responsive to said fail signal for selecting only the respective output temperature signal from each of said input means which received the respective input signal; and
means for processing each selected temperature signal so as to produce said temperature control signal without utilizing said predetermined control data, said means for processing including means for generating said temperature control signal from said predetermined control data stored in said memory means based upon the desired set temperature when none of said input means receives the respective input signal.

10. Temperature controller apparatus according to claim 7, wherein said memory means further stores therein a predetermined amount
a plurality of input means for receiving input signals representing temperatures at respective locations in said chamber and for processing each of said respective input signals so as to form respective temperature signals and for outputting the same therefrom;
means for determining whether each of said input means receives the respective input signal;
means for producing a fail signal in response to any of said input means failing to receive the respective input signal;
means responsive to said fail signal for selecting only the respective output temperature signal from each of said input means which received the respective input signal;
means for processing each selected temperature signal so as to produce said temperature control signal; and
coolant determining means for determining whether any of said coolant is contained in the at least one storage means, said coolant determining means including means for terminating the generation of said temperature control signal if none of said coolant is contained in the at least one storage means.

11. Temperature controller apparatus according to claim 9, wherein said means for processing each selected temperature signal includes a microcontroller.

12. Temperature controller apparatus according to claim 9, wherein said temperature control signal is representative of a duty cycle for said device which controls the temperature of said chamber.

13. Temperature controller apparatus according to claim 9, wherein each of said input means includes a thermocouple.

14. Temperature controller apparatus according to claim 9, further comprising display means for displaying requested information and operational information relating to the operation of said apparatus.

15. Temperature controller apparatus for generating a control signal for supply to a control device which controls the temperature of a chamber, said apparatus comprising:
a plurality of input means for receiving input signals representing temperatures at respective locations in said chamber; and
means having multiple back-up methods of producing and including means for detecting failures in the received input signals for producing said control signal from the received input signals in accordance with a first method in the absence of any detected failures, for producing said control signal from the received input signals in accordance with a second method when a failure is detected, and for producing said control signal in accordance with one of a third and fourth methods when a failure is detected in each of said received input signals.

16. Temperature controller apparatus for generating a temperature control signal for supply to a control device which controls the temperature of a chamber, said apparatus comprising:
at least one input means each receiving an input signal representing a temperature at a respective location in said chamber and for processing each said input signal so as to form a respective temperature signal and for outputting the same therefrom;
means for determining whether each said input means receives the respective input signal;
means for producing a fail signal in response to any of the at least one input means failing to receive the respective input signal;
means responsive to said fail signal for selecting only the respective output temperature signal from each said input means which received the respective input signal; and
means for processing each selected temperature signal so as to produce said temperature control signal and including means for storing temperature control signals and means for utilizing prior temperature control signals from said means for storing as said temperature control signal when none of the at least one input means receives the respective input signals.

17. Temperature controller apparatus for generating a temperature control signal for supply to a control device which controls the temperature of a chamber so as to maintain said chamber at a desired one of a plurality of set temperatures, said apparatus comprising:
memory means for storing a plurality predetermined control data, said predetermined control data being respectively related to said set temperatures;

at least one input means each receiving an input signal representing a temperature at a respective location in said chamber and for processing each said input signal so as to form a respective temperature signal and for outputting the same therefrom;

means for determining whether each said input means receives the respective input signal;

means for producing a fail signal in response to any of the at least one input means failing to receive the respective input signal;

means responsive to said fail signal for selecting only the respective output temperature signal from each said input means which received the respective input signal; and means for processing each selected temperature signal so as to produce said temperature control signal without utilizing said predetermined control data, said means for processing including means for generating said temperature control signal from said predetermined control data stored in said memory means based upon the desired set temperature when none of said input means receives the respective input signal so that there is an absence of selected temperature signals.

18. Temperature controller apparatus for generating a temperature control signal for supply to a device which regulates flow of a coolant into a chamber so as to control the temperature of said chamber, said apparatus comprising:

a plurality of input means for receiving input signals representing temperatures at respective locations in said chamber and for processing each of said respective input signals so as to form respective temperature signals and for outputting the same therefrom;

means for determining whether each said input means receives the respective input signal;

means for producing a fail signal in response to any of said input means failing to receive the respective input signal;

means responsive to said fail signal for selecting only the respective output temperature signal from each said input means which received the respective input signal;

means for processing each selected temperature signal so as to produce said temperature control signal;

memory means for storing a predetermined amount of previously produced control signals; and means for supplying the previously produced control signals stored in said memory means as said temperature control signal to said device so as to regulate the flow of said coolant into said chamber when none of said input means receives the respective input signals, said means for supplying being included in said determining means.

19. Temperature controller apparatus for generating a temperature control signal for supply to a device which regulates flow of a coolant into a chamber so as to control the temperature of said chamber, said apparatus comprising:

a plurality of input means for receiving input signals representing temperatures at respective locations in said chamber and for processing each of said respective input signals so as to form respective temperature signals and for outputting the same therefrom;

means for determining whether each said input means receives the respective input signal;

means for producing a fail signal in response to any of said input means failing to receive the respective input signal;

means responsive to said fail signal for selecting only the respective output temperature signal from each of said input means which received the respective input signal;

means for processing each selected temperature signal so as to produce said temperature control signal; and memory means for storing predetermined control data and a predetermined amount of previously produced control signals, one of the stored predetermined control data and the predetermined amount of said previously produced control signals being utilized in forming said temperature control signal when none of said input means receives the respective input signals;

said determining means including means for generating said temperature control signal from said predetermined control data stored in said memory means for supply to said device so as to regulate the flow of said coolant into said chamber when none of said input means receives the respective input signals and when said predetermined amount of said previously produced control signals are not store in said memory means.

20. Temperature controller apparatus for generating a temperature control signal for supply to a device which regulates flow of a coolant into a chamber so as to control the temperature of said chamber, said apparatus comprising:

at least one storage means for containing said coolant therein;

a plurality of input means for receiving input signals representing temperatures at respective locations in said chamber and for processing each of said respective input signals so as to form respective temperature signals and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each of said input means which received the respective input signal;

means for processing each selected temperature signal so as to produce said temperature control signal; and coolant determining means for determining whether any of said coolant is contained in the at least one storage means, said coolant determining means including means for terminating the generation of said temperature control signal if none of said coolant is contained in the at least one storage means.

21. Temperature controller apparatus for generating a temperature control signal for supply to a control device which controls the temperature of a chamber, said apparatus comprising:

a plurality of input means for receiving input signals representing temperatures at respective locations in said chamber and for processing each of said respective input signals so as to form respective temperature signals and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each of said input means which received the respective input signal;

means for processing each selected temperature signal so as to produce said temperature control signal;

memory means for storing a predetermined amount of previously produced control signals; and means for supplying the previously produced control signals stored in said memory means as said temperature control signal to said device so as to control the temperature of said chamber when none of said input means receives the respective input signals, said means for supplying being included in said determining means.

22. Temperature controller apparatus for generating a temperature control signal for supply to a control device which controls the temperature of a chamber, said apparatus comprising:

a plurality of input means for receiving input signals representing temperatures at respective locations in said chamber and for processing each of said respective input signals so as to form respective temperature signals and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each of said input means which received the respective input signal;

means for processing each selected temperature signal so as to produce said temperature control signal; and memory means for storing predetermined control data and a predetermined amount of previously produced control signals, one of the stored predetermined control data and the predetermined amount of said previously produced control signals being utilized in forming said temperature control signal when none of said input means receives the respective input signals;

said determining means including means for generating said temperature control signal from said predetermined control data stored in said memory means for supply to said device so as to control the temperature of said chamber when none of said input means receives the respective input signals and when said predetermined amount of said previously produced control signals are not stored in said memory means.

23. Temperature controller apparatus for generating a temperature control signal for supply to a device which regulates flow of a coolant into a chamber so as to control the temperature of said chamber, said apparatus comprising:

at least one storage means each receiving a respective input signal representing a temperature at a respective location in said chamber for processing each said respective input signal so as to form at least one respective temperature signal and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each said input means which received the respective input signal;

means for processing each selected temperature signal so as to produce said temperature control signal;

memory means for storing a predetermined amount of previously produced control signals; and means for supplying the previously produced control signals stored in said memory means as said temperature control signal to said device so as to regulate the flow of said coolant into said chamber when none of said at least one input means receives the respective input signals, said means for supplying being included in said determining means.

24. Temperature controller apparatus for generating a temperature control signal for supply to a device which regulates flow of a coolant into a chamber so as to control the temperature of said chamber, said apparatus comprising:

at least one input means each receiving a respective input signal representing a temperature at a respective location in said chamber for processing each said respective input signal so as to form at least one respective temperature signal and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each said input means which received the respective input signal;

means for processing each selected temperature signal so as to produce said temperature control signal; and memory means for storing predetermined control data and a predetermined amount of previously produced control signals, one of the stored predetermined control data and the predetermined amount of said previously produced control signals being utilized in forming said temperature control signal when none of said input means receives the respective input signals;

said determining means including means for generating said temperature control signal from said predetermined control data stored in said memory means for supply to said device so as to regulate the flow of said coolant into said chamber when none of said at least one input means receives the respective input signals and when said predetermined amount of said previously produced control signals are not stored in said memory means.

25. Temperature controller apparatus for generating a temperature control signal for supply to a device which regulates flow of a coolant into a chamber so as to control the temperature of said chamber, said apparatus comprising:

at least one storage means for containing said coolant therein;

at least one storage means each receiving a respective input signal representing a temperature at a respective location in said chamber for processing each said respective input signal so as to form at least one respective temperature signal and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each said input means which received the respective input signal;

means for processing each selected temperature signal so as to produce said temperature control signal; and coolant determining means for determining whether any of said coolant is contained in the at least one storage means, said coolant determining means including means for terminating the generation of said temperature control signal if none of said coolant is contained in the at least one storage means.

26. Temperature controller apparatus for generating a temperature control signal for supply to a control device which controls the temperature of a chamber, said apparatus comprising:

means for determining whether each of said input means receives the respective input signal;

means for producing a fail signal in response to any of said input means failing to receive the respective input signal;

means responsive to said fail signal for selecting only the respective output temperature signal from each said input means which received the respective input signal;

means for processing each selected temperature signal so as to produce said temperature control signal;

memory means for storing a predetermined amount of previously produced control signals; and means for supplying the previously produced control signals stored in said memory means as said temperature control signal to said device so as to control the temperature of said chamber when none of said at least one input means receives the respective input signals, said means for supplying being included in said determining means.

27. Temperature controller apparatus for generating a temperature control signal for supply to a control device which controls the temperature of a chamber, said apparatus comprising:

at least one input means each receiving a respective input signal representing a temperature at a respective location in said chamber for processing each said respective input signal so as to form at least one respective temperature signal and for outputting the same therefrom;

means for determining whether each of said input means receives the respective input signal;

means for producing a fail signal in response to any of said input means failing to receive the respective input signal;

means responsive to said fail signal for selecting only the respective output temperature signal from each said input means which received the respective input signal;

means for processing each selected temperature signal so as to produce said temperature control signal; and memory means for storing predetermined control data and a predetermined amount of previously produced control signals, one of the stored predetermined control data and the predetermined amount of said previously produced control signals being utilized in forming said temperature control signal when none of said at least one input means receives the respective input signals;

said determining means including means for generating said temperature control signal from said predetermined control data stored in said memory means for supply to said device so as to control the temperature of said chamber when none of said at least one input means receives the respective input signals and when said predetermined amount of said previously produced control signals are not stored in said memory means.

* * * * *

UNITED STATES PATENT AND TRADEMARK OFFICE
CERTIFICATE OF CORRECTION

PATENT NO. : 5,325,678

DATED : July 5, 1994

INVENTOR(S) : Frederic M. Borah et al

It is certified that error appears in the above-indentified patent and that said Letters Patent is hereby corrected as shown below:

Column 15, line 47 through column 16, line 2, change "a plurality of input means for receiving input signals representing temperatures at respective locations in said chamber and for processing each said respective input signals so as to form respective temperature signals and for outputting the same therefrom;

means for determining whether each of said input means receives the respective input signal;

means for producing a fail signal in response to any of said input means failing to received the respective input signal;

means responsive to said fail signal for selecting only the respective output temperature signal from each of said input means which received the respective input signal;

means for processing each selected temperature signal so as to produce said temperature control signal; and coolant determining means for determining whether any of said coolant is contained in the at least one storage means, said coolant determining means including means for terminating the generation of said temperature control signal if none of said coolant is contained in the at least one storage means"

UNITED STATES PATENT AND TRADEMARK OFFICE
CERTIFICATE OF CORRECTION

PATENT NO. : 5,325,678
DATED : July 5, 1994
INVENTOR(S) : Frederic M. Borah et al It is certified that error appears in the above-indentified patent and that said Letters Patent is hereby corrected as shown below:

to  --of previously produced control signals and wherein said generating means utilizes the stored previously produced control signals in generating said temperature control signal upon an occurrence of a predetermined event.--

Column 20, line 1, "storage" should read --input--.

Column 16, line 66, after "plurality" insert --of--.

Column 20, line 58, after "none of said" insert --at least one--.

Column 21, line 8, "storage" should read --input--.

UNITED STATES PATENT AND TRADEMARK OFFICE
CERTIFICATE OF CORRECTION

PATENT NO. : 5,325,678
DATED : July 5, 1994
INVENTOR(S) : Frederic M. Borah, et. al.

It is certified that error appears in the above-indentified patent and that said Letters Patent is hereby corrected as shown below:

Column 21, after line 37, insert the following paragraph:
--at least one imput means each receiving a respective input signal representing a temperature at a respective location in said chamber for processing each said respective input signal so as to form at least one respective temperature signal and for outputting the same therefrom--.

Signed and Sealed this

Thirteenth Day of December, 1994

Attest:

BRUCE LEHMAN

*Attesting Officer*     *Commissioner of Patents and Trademarks*